United States Patent [19]
Weir et al.

[11] Patent Number: 6,103,367
[45] Date of Patent: *Aug. 15, 2000

[54] COATING OF METAL SUBSTRATE FOR MAGNETIC RECORDING MEDIUM

[75] Inventors: Richard D. Weir, Agoura Hills; Carl W. Nelson, Santa Cruz, both of Calif.

[73] Assignee: Tulip Memory Systems, Inc., Fremont, Calif.

[*] Notice: This patent is subject to a terminal disclaimer.

[21] Appl. No.: 09/065,332

[22] Filed: Apr. 23, 1998

Related U.S. Application Data

[63] Continuation of application No. 07/771,348, Oct. 4, 1991, Pat. No. 5,811,182.

[51] Int. Cl.$^7$ .............................. B32B 5/14; B32B 15/04; B32B 15/20; B32B 18/00; G11B 5/62
[52] U.S. Cl. .......................... 428/336; 428/610; 428/611; 428/694 TS; 428/694 SG; 428/694 TR; 428/698; 428/651; 427/523; 360/131; 204/192.1
[58] Field of Search ...................... 428/332, 457, 428/611, 651, 694 TS, 694 SG, 698, 65.3, 65.6, 900, 64.1, 65.5, 704, 648, 64.2, 65.9, 697, 694 ST, 694 TR, 694 BS, 694 BR, 693, 610, 608, 595, 687, 336; 360/131, 135, 134; 427/523, 569; 204/192.1

[56] References Cited

U.S. PATENT DOCUMENTS

| | | |
|---|---|---|
| 3,710,072 | 1/1973 | Shrader et al. ............... 219/121 EB |
| 3,883,679 | 5/1975 | Shrader et al. ................... 13/31 |
| 3,900,592 | 8/1975 | Kennedy et al. .................. 427/39 |
| 4,057,831 | 11/1977 | Jacobs et al. ................... 358/128 |
| 4,743,491 | 5/1988 | Asada et al. ................... 428/213 |
| 4,836,865 | 6/1989 | Sakakima et al. ............... 148/306 |
| 5,068,152 | 11/1991 | Mano et al. ................... 428/408 |
| 5,202,810 | 4/1993 | Nakamura et al. .............. 360/135 |
| 5,811,182 | 9/1998 | Weir et al. ................... 428/336 |

FOREIGN PATENT DOCUMENTS

| | | |
|---|---|---|
| 52-105804 | 9/1977 | Japan . |
| 57-050324 | 3/1982 | Japan . |
| 59-217225 | 7/1984 | Japan . |
| 59-148129 | 8/1984 | Japan . |
| 60-205824 | 10/1985 | Japan . |
| 1199224 | 9/1986 | Japan . |
| 62-128021 | 6/1987 | Japan . |
| 62-219322 | 9/1987 | Japan . |
| 62-243115 | 10/1987 | Japan . |

OTHER PUBLICATIONS

"Gas–Scattering and Ion–Plating Deposition Methods" by Kurt D. Kennedy, et al.; AIRCO Temescal Div., Air Reduction Company, Inc.; Sep. 15, 1971.

"Physical Vapor Deposition" by Kurt Kennedy; AIRCO Temescal; Apr. 19, 1972.

"Electron Beam Techniques For Ion Plating" by D.L. Chambers, et al.; AIRCO Temescal; May 1971.

(List continued on next page.)

*Primary Examiner*—Deborah Jones
*Assistant Examiner*—Michael LaVilla
*Attorney, Agent, or Firm*—Limbach & Limbach, LLP

[57] ABSTRACT

A coated metal-substrate disk for magnetic-recording applications is disclosed having a first coating selected from the group consisting of nitrides, carbides, or borides of titanium, zirconium, hafnium, vanadium, niobium, tantalum, chromium, molybdenum, or tungsten, or the group consisting of aluminum nitride, silicon nitride, or silicon carbide on the metal substrate and a magnetic-recording material coating on the first coating. The first coatings are applied by evaporative reactive ion plating or by reactive sputtering.

13 Claims, 2 Drawing Sheets

OTHER PUBLICATIONS

"New Developments In Ion Plating" ViewPort, Issue No. 1, AIRCO Temescal; 1972. (no month).

"Current Developments In Ion Plating" by Hugh R. Smith, Jr., AIRCO Temescal; Mar. 23, 1972.

"Evaporation", Deposition Technologies For Films And Coatings; pp. 84–89; pp. 126–129; Noyes Publications, 1982. (no month).

"Ion Plating Technology" by Donald M. Mattox; Deposition Technologies For Films And Coatings; pp. 244–287; Noyes Publicsions, 1982. (no month).

"Microstructural Control of Plasma–Sputtered Refractory Coatings" by David W. Hoffman and Robert C. McCune; Handbook of Plasma Processing Technology; pp. 483–517; Noyes Publications, 1990. (no month).

"Effect of Ion Bombardment During Deposition on Thick Metal and Ceramic Deposits", J. Vac. Sci. Technol., vol. 11, No. 4, Jul./Aug. 1974, by R.D. Bland, et al.

"Study of Plararized Sputter–Deposited $SIO_2$" J. Vac. Sci. Technol., 15 (May/Jun. 30, 1978 by C.Y. Ting, et al.

"$SIO_2$ Planarization by Two–Step rf Bias–Sputtering", J. Vac. Sci. Technol. B 3(3), May/Jun. 1985 by T. Mogami, et al.

COATING OF METAL SUBSTRATE FOR MAGNETIC RECORDING MEDIUM

This is a continuation of application Ser. No. 07/771,348, filed Oct. 4, 1991, now U.S. Pat. No. 5,811,182.

BRIEF DESCRIPTION OF THE INVENTION

The present invention relates generally to magnetic-recording disk fabrication, and more specifically to coating an aluminum-alloy or other metal substrate to prepare it for a coating of a suitable magnetic-recording material.

BACKGROUND OF THE INVENTION

In a disk file, the most common recording medium is a very flat and smooth aluminum-alloy disk having both of its surfaces coated with a ferromagnetic or ferromagnetic oxide powder dispersed in a resin binder or a ferromagnetic cobalt alloy as a plated or sputter-deposited thin film. Aluminum is a soft metal and therefore, in the attempt to avoid read/write failure caused by the read/write head impacting the disk too forcefully, the aluminum-alloy disk is typically first coated with a hard material before the ferromagnetic cobalt alloy is applied.

In the fabrication of a magnetic-recording disk an aluminum-alloy disk with surfaces that are either diamond tool turned on a lathe or ground by a surface grinder is used. These machined surfaces result in matte finishes. Alternatively, disk substrates could be precision blanked from flat precision cold-rolled aluminum-alloy sheet or other metal strip whose surface finish would replicate that of the work rolls used in the finishing pass of the rolling mill. For example, with work rolls that have been ground and polished to a mirror-bright finish, a metal strip with a mirror-bright surface finish would result. Typically, the aluminum-alloy disk is coated with an electroless-deposited nickel-phosphorus alloy, which is nonmagnetic. However, in order for this plating to adhere properly to the matte surface of an aluminum-alloy disk, a zincate solution is used to dissolve the surface aluminum oxides, hydroxyoxides, and hydrous oxides, and to provide a zinc metal monolayer by replacement reaction. The surface of the electroless-deposited-nickel-phosphorus-alloy-coated aluminum-alloy disk must be lapped and polished prior to the subsequent plating or sputter-deposition of the magnetic layer. Therefore, the fabrication must engage in the laborious lapping and polishing of the disk substrate. This lapping and polishing step is expensive and adds substantial costs to the final disk product. Furthermore, it is extremely difficult to obtain flaw-free electroless-deposited nickel-phosphorus-alloy coatings. Nodules, pits, and bumps occur in these coatings and such defects cause recording errors.

In addition, the electroless-deposited nickel-phosphorus alloy is very prone upon heating to recrystallization, where the nonmagnetic (actually, paramagnetic) nonequilibrium extremely microcrystalline supersaturated-solid-solution single phase of nickel and phosphorus separates into two equilibrium crystalline phases, namely, nickel, which is ferromagnetic, and nickel phosphide. The resulting ferromagnetism renders the media useless for the magnetic-recording application.

The electroless-deposited-nickel-phosphorus-alloy-coated aluminum-alloy disk is also subject upon heating to warpage because of an abrupt coating-substrate interface and the stress concentration at this interface. This warpage also renders the media useless.

SUMMARY AND OBJECTS OF THE INVENTION

It is a general object of the present invention to provide a magnetic-recording disk and a process for manufacture of a magnetic-recording disk.

It is another object of the present invention to reduce the costs involved in the manufacture of a magnetic-recording disk.

It is a further object of the present invention to apply a coating to a flat cold-rolled or surface-ground aluminum-alloy or other metal substrate surface.

It is yet another object of the present invention to provide for an aluminum-alloy or other metal substrate a coating which has strong adhesion to the substrate, is hard, refractory, chemically inert, while having a mirror-bright surface.

It is a further object of the present invention to provide for an aluminum-alloy or other metal substrate a coating which has strong adhesion to the substrate, is hard, refractory, chemically inert, while accurately replicating the substrate surface roughness features (the peaks and valleys).

It is another object of the present invention to provide a means of achieving a very high deposition rate in applying a coating to a substrate and over several substrates.

It is yet a further object of the present invention to use compositions in the titanium-nitrogen binary system or any number of compositions in similar binary and mixed binary systems as the coating for the aluminum-alloy or other metal substrate.

It is a further object of the present invention to use titanium nitride (TiN) as the coating for the aluminum-alloy or other metal substrate.

It is another object of the present invention to apply the coating to the substrate by evaporative reactive ion plating or by reactive sputtering.

The foregoing and other objects of the invention are achieved by a coated metal-substrate disk for magnetic-recording applications which includes a coating on a metal disk of a desirable composition in the titanium-nitrogen system or in related similar systems applied to a flat cold-rolled or surface-ground metal disk substrate by evaporative reactive ion plating or by reactive sputtering. A suitable ferromagnetic cobalt-alloy coating is applied to this coating.

An extremely important feature of this invention is that a magnetic-recording disk is obtained which will allow the magnetic-recording-and-read-detection transducer to be in contact with the disk surface during operation. Specifically, the disk surface will not crack, break, gouge, or deform due to the operation of the read-write transducer when the disk is spinning at typical operating speeds.

Another important feature of this invention is that graded interfacial diffusion or pseudo-diffusion layers are formed by the Ti metal between the aluminum-alloy or other metal substrate and the TiN coating. This graded interfacial region provides a gradual change in composition and stress across the layer, first, with a concentration gradient of titanium into the surface of the aluminum-alloy or other metal substrate, and second, a concentration gradient of the titanium into the titanium nitride coating. By such means, the adhesion, toughness, and durability of the coating are enhanced.

DESCRIPTION OF THE PREFERRED EMBODIMENT

Figure 1:
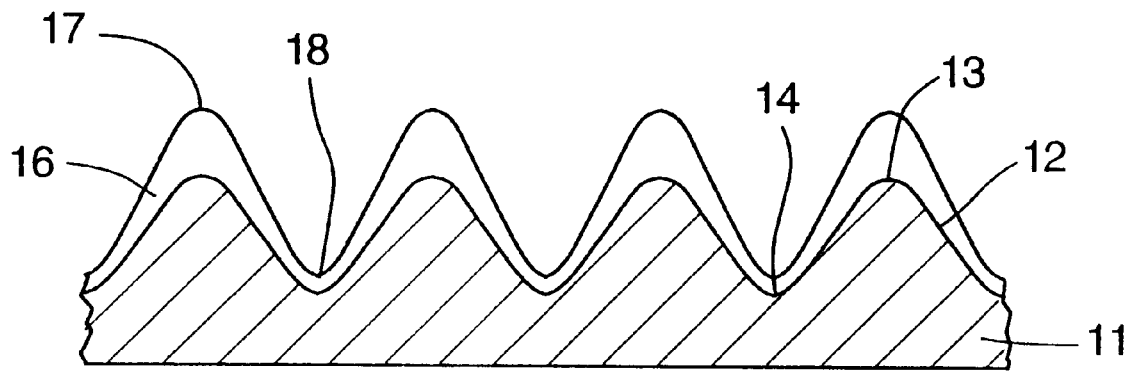
FIG. 1 depicts a cross section of a substrate when the bombardment energy level is sufficiently low that the peaks and valleys of the substrate are exaggerated by the coating.

Reference will now be made in detail to the preferred embodiments of the invention. While the invention will be described in conjunction with the preferred embodiments, it will be understood that they are not intended to limit the invention to those embodiments. On the contrary, the invention is intended to cover alternatives, modifications, and equivalents, which may be included within the spirit and scope of the invention as defined by the claims.

Turning now to the drawings, wherein like components are designated by like reference numerals, attention is directed to FIGS. 1 through 4. The present invention is depicted in conjunction with an illustration that the coating morphology and microstructure obtained with such glow-discharge deposition processes as evaporative ion plating and sputtering depend upon the degree of energetic atom and/or ion bombardment received by the depositing film (i.e., the arriving atoms at the substrate).

A conventional machined-surfaced aluminum-alloy disk substrate or other suitable substrate where the surface has not been lapped and polished, therefore, on a microscopic scale, has peaks and valleys. With the use of the machine-finished substrate, the cost of manufacturing a magnetic-recording disk is significantly less than the cost of a disk for which the aluminum-alloy substrate is coated with an electroless-deposited nickel-phosphorus alloy and then subsequently lapped and polished. In FIGS. 1 through 4, a cross section is depicted of a substrate 11 having an idealized surface 12 roughness with surface peaks 13 and surface valleys 14 and with a single frequency and amplitude for purpose of illustration. Real surfaces are much more complex.

FIG. 1 depicts the case where the energy involved per depositing atom is sufficiently low so that the coating 16 is characteristic of the thermalized-atom-deposited porous columnar Zone 1 structure on the Movchan-Demchishin-Thornton zone-structure diagram (not shown). As the thickness of the coating 16 increases the surface roughness increases with the result that the coating peaks 17 are higher and the coating valleys 18 are deeper than those of the substrate surface 12.

Figure 2:
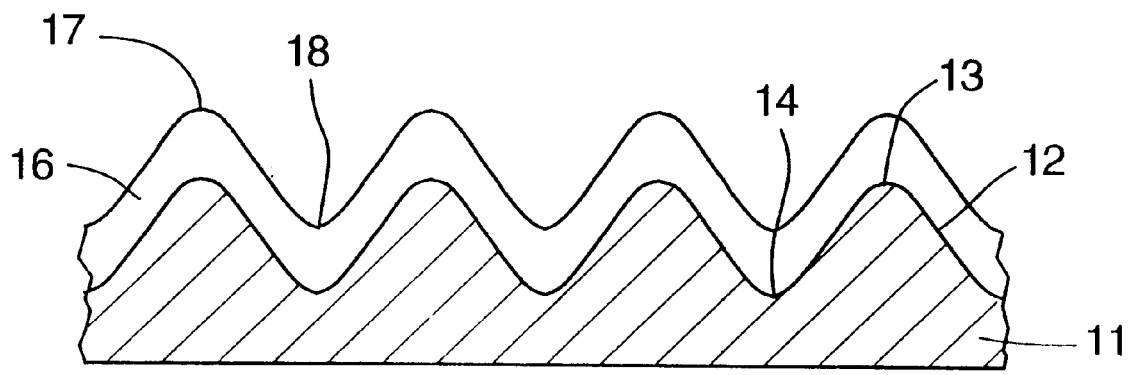
FIG. 2 depicts a substrate where the bombardment energy level is higher than that as depicted in FIG. 1 and therefore the coating conforms to the substrate.

FIG. 2 depicts the case where the energy involved per depositing atom is sufficiently high so that the coating 16 is characteristic of the energetic-atom-deposited dense fibrous Zone T structure on the Movchan-Demchishin-Thornton zone-structure diagram. Here the coating 16 is completely conformal where the substrate 12 is accurately replicated.

Figure 3:
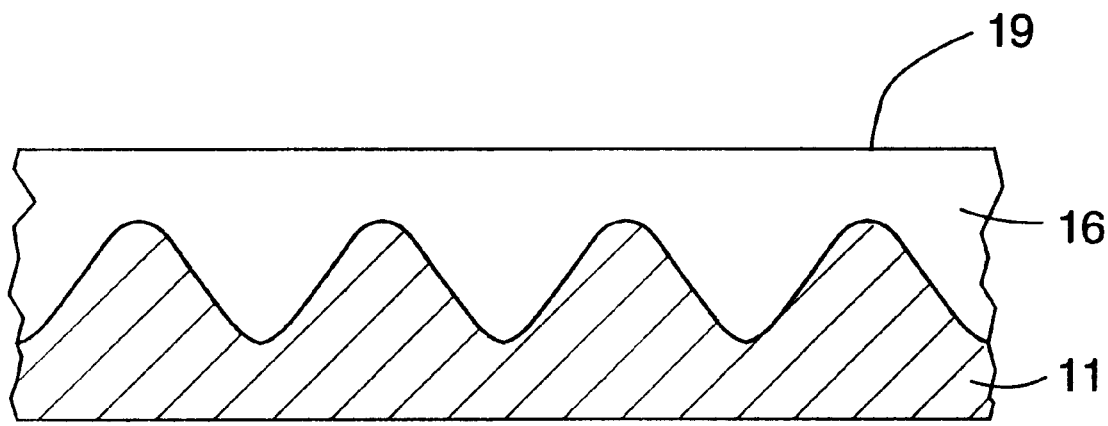
FIG. 3 shows a substrate where the bombardment energy level of a composition of the present invention is sufficiently high to cause a levelized coating.

FIG. 3 depicts the case where the energy involved per depositing atom is still higher and this coating, too, is characteristic of the energetic-atom-deposited dense fibrous Zone T structure. Here a levelized coating 16 is obtained. The energetic atom and/or ion bombardment is sufficiently high to erode what-would-have-been surface roughness peaks and to redistribute the film material into the valleys.

Figure 4:
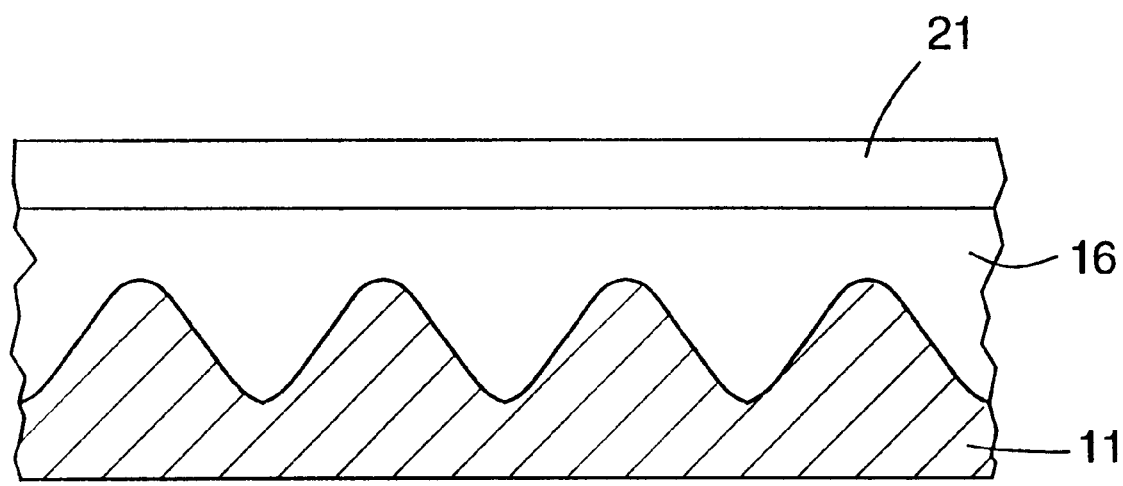
FIG. 4 shows the substrate coated with a composition of the present invention further coated with a magnetic-recording material.

FIG. 4 depicts the case illustrated in FIG. 3 with an additional coating such as a suitable magnetic-recording material 21 over the TiN coating 16. Magnetic-recording materials are well known in the art and any such material is applied to the TiN coating 16. For example, a chromium layer and an appropriate cobalt-alloy layer are used.

The surfaces of the aluminum-alloy or other metal disk substrates can be appropriately textured to give a circumferential scratch pattern. This intentional surface roughening serves simultaneously two desirable purposes: 1) tribologically, to minimize stiction and friction at the head-to-disk interface; and 2) on the subsequently sputter-deposited films of the chromium or chromium-alloy underlayer and the cobalt-alloy magnetic layer, to provide preferred orientation of the crystallites along the circumferential texture lines in the substrate plane. In the ion-plating technique, there is a strong tendency for the surface of the deposited film to be made smoother, whereby the ion bombardment of the depositing film erodes what-would-have-been surface roughness peaks and redistributes film material into the valleys. Consequently, the texturing of the disk substrate surface by the abrasive tape should be more severe (the peak-to-valley heights greater) than ordinarily in order to compensate for the extraordinary levelizing effect obtained in the ion-plated coatings.

The deposition of titanium nitride or any other composition or compound of the present invention may be achieved by evaporative reactive ion plating. A six-shaft drum planetary substrate holder, which combines both rotational and translational motion, provides simultaneous deposition on both disk sides, and contains 90 or more disk substrates, is preferably used to obtain a uniform thickness distribution across the disk diameter and also from disk to disk over a substantial number of disks.

Very-high-deposition-rate ion plating was first demonstrated by D. L. Chambers and D. C. Carmichael in 1971 at Battelle Memorial Institute, Columbus, Ohio, in their invention of combining an Airco Temescal 270° magnetic-field-deflected electron-beam evaporation source (designed by R. L. Shrader and K. N. Tsujimoto) with glow-discharge substrate bias sputtering. This approach made the earlier invention in 1963 of ion plating by D. M. Mattox, Sandia Corp., Albuquerque, N. Mex., a much more versatile and practical technique and a very attractive one from the standpoint of very high deposition rates over substantial areas.

Another useful high-rate evaporation source, sharing with the above-mentioned Airco Temescal source the advantages of a water-cooled copper hearth to contain the evaporant, but having instead a hot-hollow-cathode-discharge beam, was first described by J. R. Morley in 1963, and later implemented in the ion-plating application by J. R. Morley and H. R. Smith, Jr., in 1972 at Airco Temescal, Berkeley, Calif.

The very interesting and useful metallic titanium-nitrogen system was investigated in 1971–1972 at Airco Temescal where coatings of various compositions from Ti through $Ti_3N$ and $Ti_2N$ to TiN were deposited by evaporative reactive ion plating. A very broad spectrum of coating hardness can be obtained by varying the ratio of the titanium deposition rate to the nitrogen partial pressure in the argon-nitrogen gas mixture.

Other references include D. L. Chambers and D. C. Carmichael, "Development of Processing Parameters and Electron-Beam Techniques for Ion Plating," Proceedings of the 1971 Conference of the Society of Vacuum Coaters, Miami, Fla. (1971); D. L. Chambers and D. C. Carmichael, "Electron-Beam Techniques for Ion Plating," Research/Development Magazine 22, No. 5, 32 (May 1971); R. L. Shrader and K. N. Tsujimoto, "Vapor Source Assembly," U.S. Pat. Nos. 3,710,072, issued Jan. 6, 1973 (filed May 10, 1971), assigned to Airco, Inc.; 3,883,679, issued May 13, 1985 (filed May 6, 1974), assigned to Airco, Inc.; D. M. Mattox, "Film Deposition using Accelerated Ions," Sandia Corp. Report No. SC-DR-281-63 (1963); D. M. Mattox, "Film Deposition using Accelerated Ions," Electrochem Tech. 2, 295 (1964); J. R. Morley, Trans. Vac. Met. Conf. 1963, American Va. Soc., p. 186; J. R. Morley and H. R. Smith, Jr., J. Vac. Sci. Technol. 9, 1377 (1972); K. D. Kennedy, G. R. Scheuermann, and H. R. Smith, Jr., "Gas Scattering and Ion-Plating Deposition Methods," Research/Development Magazine 22, No. 11, 40 (November 1971).

In order to obtain a coating with the above-discussed desirable properties with the use of titanium as well as the transition metals of Periodic Table Groups IV, V, and VI in general combined with either nitrogen, carbon, or boron, the processing parameters of the evaporative-reactive-ion-plating system must be properly controlled and adjusted with respect to one another. For the case of titanium nitride, the desired coating morphology is obtained by properly adjusting (1) the titanium evaporation rate with control of the power input to the titanium evaporant contained in the water-cooled copper hearth, and hence the titanium arrival rate at the substrates, and (2) the titanium sputtering emission rate of the arriving not-yet-locked-in-place atoms at the substrate with control of the 13.56 MHz rf power input (and hence the self-bias voltage across the dark-space region of the gas discharge adjacent to the substrates) to the planetary substrate holder, and (3) the total gas pressure and the partial pressures of argon and nitrogen with control of their respective mass flowrates and with control of the effective pumping speed of the system. Alternatively, the planetary substrate holder can be dc powered, and then the dc power input and dc voltage must be appropriately adjusted.

Evaporative reactive ion plating of titanium nitride is achieved in an ion-plating coating system consisting of a water-cooled copper hearth from which titanium metal by electron-beam bombardment is heated and evaporated at high rates into a discharge of argon (Ar) and nitrogen ($N_2$)gases, the glow discharge being sustained by 13.56 MHz high-radio-frequency power coupled to an electrically isolated planetary substrate holder.

Prior to beginning the deposition, the disk substrates (along with the planetary substrate holder) are sputter-etched cleaned by means of, first, a filtered-air gas discharge operated anywhere in the pressure range of 13.3 Pa (100 mtorr) to 133 Pa (1000 mtorr) and at a developed dc bias voltage anywhere between –10 V to –100 V, measured with respect to ground. This step is easily accomplished because the 13.56 MHz rf power is coupled to the planetary substrate holder. The air glow-discharge cleaning selectively and rapidly removes carbonaceous substances and organic contaminants such as oils, greases, and waxes by converting them into volatile gases ($CO$, $CO_2$, and $H_2O$) which are pumped away.

The surface oxides and hydrous oxides are then removed from the disk substrates by means of argon ion bombardment from an argon gas discharge at a pressure of about 1.0 Pa (7.5 mtorr) and at a developed dc bias voltage between –300 V and –3000 V, measured with respect to ground. The argon gas discharge at the same pressure, but with the substrate bias voltage now between –100 V and –1000 V, is continued into the deposition which at first should only be titanium metal to a thickness of 50 to 3000 Å before the nitrogen gas is admitted.

Upon the admission of the nitrogen gas to the argon gas discharge, TiN, or other compositions in the titanium-nitrogen binary system, is deposited to a 0.5 to 6 micrometer thickness. This is accomplished by a graduated increase of nitrogen gas up to approximately 5% of the total gas pressure. The nitrogen pressure depends upon the required nitrogen content of the composition selected from the titanium-nitrogen system which can be down to a one-to-one ratio of titanium to nitrogen. This system includes such compositions as $Ti_9N$, $Ti_8N$, $Ti_6N$, $Ti_5N$, $Ti_4N$, $Ti_3N$, $Ti_2N$, and TiN. Preferably, the nitrogen is eased into the argon-nitrogen mixture to ultimately achieve a coating consisting of TiN, the hardest composition in the system. Both the argon and nitrogen gas flowrates are controlled by individual mass flow controllers. The total pressure of these gases is measured by a broad-range Bayard-Alpert ionization gauge. The high-vacuum and backing pumps have sufficient capacity to maintain clean pumping through the various steps.

For a planetary substrate holder containing 90 or more disks, the very high film deposition rate is achieved by providing approximately 5 to 15 kW power to the titanium evaporant contained within the water-cooled hearth of the electron-beam evaporation source or the hot-hollow-cathode-discharge-beam evaporation source.

The coating results described above that were obtained by evaporative reactive ion plating in the ion-plating system also described above can, too, be obtained by reactive sputter-deposition in a properly configured sputtering system equipped with substrate bias sputtering.

Although the above descriptions pertain to the formation of evaporative-reactive-ion-plated and reactive-sputter-deposited coating of titanium nitride (TiN) from the metal titanium evaporant or target, respectively, in a glow discharge of an appropriate argon-nitrogen gas mixture, the same equipments and process can be used to form coatings of nitrides, carbides, and borides of all Periodic Table Groups IV, V, and VI transition metals. All of these materials share similar physical properties and mechanical characteristics in their hardness, refractoriness, and chemical inertness. Specifically, the coating of the present invention can include nitrides, carbides, and borides of titanium, zirconium, hafnium, vanadium, niobium, tantalum, chromium, molybdenum, and tungsten.

The respective metal evaporant or target would be used with a glow discharge of an appropriate argon-nitrogen ($Ar$—$N_2$) or argon-ammonia ($Ar$—$NH_3$) gas mixture to form the corresponding nitride; similarly, an appropriate argon and hydrocarbon, such as methane ($CH_4$), ethylene ($H_2C$=$CH_2$), or acetylene (HC=CH), gas mixture to form the corresponding carbide; and an appropriate argon and diborane ($B_2H_6$) gas mixture to form the corresponding boride, by evaporative reactive ion plating or by reactive sputter deposition, respectively.

Although the above description pertains to the use of compositions from metallic-conducting metal binary systems with nitrogen, carbon, or boron, electrically insulating compositions and compounds that are hard, refractory, and chemically inert could as well serve as a coating for the aluminum-alloy or other metal disk substrate. Such substances include aluminum nitride (AlN), silicon nitride ($Si_3N_4$), and silicon carbide (SiC). Being insulators, the deposition of these materials in the desired energetic-atom-deposited dense fibrous Zone T structure requires the use of 13.56 MHz rf power to be coupled to the substrate holder.

In view of the foregoing, it is clear that all of the objectives of the present invention have been met. The general object of the present invention to provide a magnetic-recording disk and a process for manufacture of a magnetic-recording disk has been met. Also met is the object to reduce the costs involved in the manufacture of a magnetic-recording disk. Moreover, object of the present invention to apply a coating to a metal substrate surface which has not been lapped and polished has been met. The object to provide for a metal substrate a coating which has strong adhesion to the substrate, is hard, and has a mirror-bright surface or accurately replicates the substrate surface has also been met by the present invention. The object of the present invention to provide a means of achieving a very high deposition rate has been met. Furthermore, the object of the present invention to use a composition or compositions selected from the titanium-nitrogen system, such as titanium nitride, or any number of related compounds as the metal-substrate coating has been met. Finally, the object of the present invention to apply the coating of the present invention to the substrate by evaporative reactive ion plating or by reactive sputtering has been met.

While the invention has been shown and described in what is presently conceived to be the most practical and preferred embodiment of the invention, it will become apparent to those skilled in the art that many modifications thereof may be made within the scope of the invention, which scope is to be accorded the broadest interpretation of the claims so as to encompass all equivalent structures and devices.

What is claimed is:

1. A recording medium for magnetic-recording applications, comprising:
    a metal substrate;
    a first coating on said substrate selected from the group consisting of aluminum nitride, silicon nitride, silicon carbide, and nitrides, carbides, and borides of titanium, zirconium, hafnium, vanadium, niobium, tantalum, chromium, molybdenum, or tungsten wherein the thickness of the first coating is greater than 0.5 micrometers and less than 6.0 micrometers, and wherein the first coating is characterized by an energetic-atom-deposited dense fibrous Zone T structure; and
    a magnetic-recording material coating on said first coating.

2. A recording medium as recited in claim 1 wherein said metal substrate is composed of an aluminum alloy.

3. A recording medium as recited in claim 1 wherein said metal substrate prior to application of the first coating has a matte surface finish.

4. A recording medium as recited in claim 1 wherein said metal substrate prior to application of the first coating has a circumferentially scratched surface finish.

5. A recording medium as recited in claim 1 wherein said metal substrate prior to application of the first coating has a smooth mirror-bright surface finish.

6. A recording medium as recited in claim 1 wherein said first coating is applied to said substrate by evaporative reactive ion plating.

7. A recording medium as recited in claim 1 wherein said first coating is applied to said substrate by reactive sputtering.

8. A recording medium as recited in claim 1 wherein the first coating has a concentration gradient of aluminum, silicon, titanium, zirconium, hafnium, vanadium, niobium, tantalum, chromium, molybdenum, or tungsten across an interface between the metal substrate and the first coating.

9. A recording medium as recited in claim 1 wherein the first coating has a concentration gradient of aluminum, silicon, titanium, zirconium, hafnium, vanadium, niobium, tantalum, chromium, molybdenum, or tungsten with concentration decreasing outwardly from the substrate.

10. A recording medium as recited in claim 1 where the first coating is a mixed binary system composed of more than one compound selected from the group consisting of aluminum nitride, silicon nitride, silicon carbide, and nitrides, carbides, and borides of titanium, zirconium, hafnium, vanadium, niobium, tantalum, chromium, molybdenum, or tungsten.

11. A recording medium for magnetic-recording applications, comprising:
    a metal substrate;
    a first coating on the substrate of a composition in the titanium-nitrogen binary system, wherein the first coating is characterized by an energetic-atom-deposited dense fibrous Zone T structure, and wherein the thickness of the first coating is greater than 0.5 micrometers and less than 6.0 micrometers; and
    a magnetic-recording material coating composed of a cobalt alloy on said first coating.

12. A recording medium for magnetic-recording applications, comprising:
    a metal substrate;
    a first coating on the substrate selected from the group consisting of aluminum nitride, silicon nitride, silicon carbide, and nitrides, carbides, and borides of titanium, zirconium, hafnium, vanadium, niobium, tantalum, chromium, molybdenum, or tungsten, wherein the first coating is characterized by an energetic-atom-deposited dense fibrous Zone T structure, and wherein the thickness of the first coating is greater than 0.5 micrometers and less than 6.0 micrometers; and
    a magnetic-recording material coating composed of a cobalt alloy on said first coating.

13. A recording medium for magnetic-recording applications, comprising:
    a metal substrate;
    a first layer on the substrate, wherein the first layer is aluminum, silicon, titanium, zirconium, hafnium, vanadium, niobium, tantalum, chromium, molybdenum, or tungsten;
    a second layer on the first layer, wherein the second layer is selected from the group consisting of aluminum nitride, silicon nitride, silicon carbide, and nitrides, carbides, and borides of titanium, zirconium, hafnium, vanadium, niobium, tantalum, chromium, molybdenum, or tungsten, wherein the second layer is characterized by an energetic-atom-deposited dense fibrous Zone T structure; and
    a layer of a magnetic-recording material on the second layer.

* * * * *